United States Patent
Axmon et al.

(10) Patent No.: US 9,445,291 B2
(45) Date of Patent: Sep. 13, 2016

(54) METHOD AND APPARATUS FOR INTER-FREQUENCY MEASUREMENTS IN A COMMUNICATION NETWORK

(71) Applicant: Telefonaktiebolaget L M Ericsson (publ), Stockholm (SE)

(72) Inventors: Joakim Axmon, Kävlinge (SE); Bengt Lindoff, Bjärred (SE); Torgny Palenius, Barsebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 14/052,021

(22) Filed: Oct. 11, 2013

(65) Prior Publication Data
US 2015/0050889 A1 Feb. 19, 2015

Related U.S. Application Data

(60) Provisional application No. 61/866,675, filed on Aug. 16, 2013.

(51) Int. Cl.
*H04W 72/00* (2009.01)
*H04W 24/08* (2009.01)
(Continued)

(52) U.S. Cl.
CPC ............. *H04W 24/08* (2013.01); *H04W 24/10* (2013.01); *H04W 88/06* (2013.01)

(58) Field of Classification Search
CPC ............................ H04W 24/10; H04L 1/1887
USPC ...................................................... 455/67.11
See application file for complete search history.

(56) References Cited

U.S. PATENT DOCUMENTS 8,121,590 B2 * 2/2012 Kazmi .................. H04W 24/10
                                                          455/423
8,391,861 B2    3/2013 Breuer et al.
(Continued)

FOREIGN PATENT DOCUMENTS

| EP | 2088805 A1 | 8/2009 |
| EP | 2385723 A1 | 11/2011 |
| WO | 2012047168 A1 | 4/2012 |

OTHER PUBLICATIONS

3rd Generation Partnership Project, "3GPP TS 36.133 V8.1.0 (Mar. 2008)," 3rd Generation Partnership Project; Technical Specification Group Radio Access Network; Evolved Universal Terrestrial Radio Access (E-UTRA); Requirements for support of radio resource management (Release 8). Mar. 2008. pp. 1-25.
(Continued)

*Primary Examiner* — Edward Urban
*Assistant Examiner* — Max Mathew
(74) *Attorney, Agent, or Firm* — Murphy, Bilak & Homiller, PLLC

(57) ABSTRACT

In one aspect of the teachings herein, a wireless device operating in a wireless communication network determines the measurement rate to use for making inter-frequency measurements on a given frequency layer, based on a performance requirement specified for that layer. For example, the wireless device uses a higher measurement rate for a frequency layer that has a performance requirement that is higher than the performance requirement specified for another one of the layers on which it is to perform inter-frequency measurements. Correspondingly, in an example scenario, a network node sends measurement configuration information to a targeted device, where that information indicates the layers on which the device is to perform inter-frequency measurements and indicates the performance requirements corresponding to respective ones of those layers. By way of example, the network node may be a base station, a relay, or another wireless device.

20 Claims, 9 Drawing Sheets

(51) Int. Cl.
*H04W 24/10* (2009.01)
*H04W 88/06* (2009.01)

(56) References Cited

U.S. PATENT DOCUMENTS

| | | | | |
|---|---|---|---|---|
| 8,718,568 B2* | 5/2014 | Marinier | ............... | H04W 24/10 370/331 |
| 8,750,807 B2* | 6/2014 | Lin | ............... | H04W 24/10 455/436 |
| 2008/0146231 A1* | 6/2008 | Huang | ............... | H04L 1/20 455/436 |
| 2008/0189970 A1 | 8/2008 | Wang et al. | | |
| 2009/0325501 A1 | 12/2009 | Somasundaram et al. | | |
| 2010/0041384 A1* | 2/2010 | Kazmi | ............... | H04W 88/10 455/419 |
| 2012/0287911 A1 | 11/2012 | Takano et al. | | |
| 2013/0039342 A1 | 2/2013 | Kazmi | | |
| 2015/0056925 A1* | 2/2015 | Jung | ............... | H04W 24/10 455/67.11 |
| 2015/0156650 A1* | 6/2015 | Li | ............... | H04W 72/085 455/67.11 |

OTHER PUBLICATIONS

Unknown Author, "Inter-frequency measurements (Nokia)", 3GPP TSG-RAN WG2 Meeting #82 R2-131897 Fukuoka, Japan, May 20-24, 2013, 1-14.

Unknown Author, "Inter-frequency Pico cell measurements for Hetnet deployments", 3GPP TSG-RAN WG2 #76 R2-115745 San Francisco, USA, Nov. 14-18, 2011, 1-4.

* cited by examiner

METHOD AND APPARATUS FOR INTER-FREQUENCY MEASUREMENTS IN A COMMUNICATION NETWORK

RELATED APPLICATIONS

This application claims priority from the U.S. provisional patent application filed on 16 Aug. 2013 and assigned Application No. 61/866,675, which application is incorporated by reference herein.

TECHNICAL FIELD

The present invention generally relates to wireless communication networks and particularly relates to configuring and performing inter-frequency measurements in such networks.

BACKGROUND

A typical operator today may have GSM, WCDMA/HSPA and LTE carriers operating simultaneously on different carrier frequencies. These different Radio Access Technologies, RATs, and corresponding carriers may however have different geographic coverage. For instance, LTE may be deployed in only urban areas, whereas GSM and HSPA coverage may be deployed in both urban and rural regions.

Furthermore, for LTE, more than forty frequency bands are defined in the 3GPP standard, and even if most of them are not universally available frequency bands, an operator in the near future may deploy LTE on multiple carrier frequencies. One or two carriers may be used for coverage and hence deployed in macro cells, while the remaining carriers may be used for hot spot or pico cell coverage. This deployment scenario is especially applicable in urban areas where several LTE carriers on additional frequency layers may be deployed, to provide hot spots in order to cope with high capacity demand.

FIG. 1 illustrates an example in the context of the above scenario. In the diagram, a wireless communication network 10 includes a number of large macro cells 12 that are deployed on a first carrier f0. By way of example, the diagram shows macro cells 12-1 and 12-2, which have at least partially overlapping macro-large-coverage areas. One further sees a number of hotspots or pico cells 14, which individually use one of the carrier frequencies f1, f2, f3 and f4. By way of example, one sees hotspots 14-1 through 14-4 on carrier frequency f1, hotspots 14-5 through 14-8 on carrier frequency f2, hotspots 14-9 through 14-12 on carrier frequency f3, and hotspots 14-13 through 14-15 on carrier frequency f4.

Several of the hotspot carriers may be deployed in the same coverage area. That is, a given hotspot 14 operating on one of the hotspot carriers may overlap geographically with another hotspot operating on another one of the hotspot carriers. For example, there may be overlapping hotspot coverage via carrier f1 and f2 in a given coverage area, while carriers f3 and f4 provide the same or overlapping hotspot service in another coverage area, etc.

For optimal usage of multiple carriers in deployments such as shown in the example of FIG. 1, a wireless communication device operating in the network 10 needs to monitor the carriers based on making inter-frequency measurements. Based on making these inter-frequency measurements, the device reports signal strength for detected cells on respective carriers, to a network, NW, node, such as a supporting base station in the network 10. The NW node then initiates handover, HO, of the device to the then-best carrier and cell, as the serving carrier and cell.

However, typical low-end devices are only equipped with one receiver and hence cannot receive on different carrier frequencies simultaneously. Consequently, such a device needs to interrupt its data reception on a given carrier frequency to perform measurements on other carrier frequencies. Such measurements are performed using configured measurement gaps, which are specified for use in performing measurements on other carrier frequencies. The 3GPP Technical Specification TS 36.300 includes example details regarding measurement gaps, which are periods where the device switches off its receiver and transmitter from a serving cell, so that it can receive transmissions from another cell. These gaps are synchronized with respect to the serving base station of the device, because the serving base station must know when the device will be performing inter-frequency measurements. As is known, Radio Resource Control, RRC, signaling is used to configure the gap period used by the device.

FIG. 2 shows the measurement gap principle as implemented in LTE. A 6 ms gap is allocated every 40 ms or every 80 ms, once inter-frequency measurement gaps are triggered. The 6 ms gap allows time for the device to find synchronization signals and Common Reference Signals, CRS, in the context of inter-frequency LTE measurements, or to find the same kind of signals in the context of inter-RAT measurements, such as where the device makes inter-frequency measurements on WCDMA/HSPA carriers, for example. The gap duration takes switching times into account.

In earlier releases of LTE, inter-frequency measurements in the same RAT or across different RATs was mainly used to address the problem of a device going out of coverage, e.g., going out of a relatively limited LTE coverage area. This problem was more prevalent in the early days of LTE deployment, when LTE coverage was initially quite limited and then expanded over time. For example, an urban area may have LTE coverage along with coverage from one or more other RATs, with the LTE coverage ending at or around the borders of the urban area. In such cases, inter-frequency measurements would be triggered as the device approached the limits of LTE coverage, so that the device began doing inter-frequency measurements and ultimately underwent a handover from LTE to, say GSM or WCDMA, before going out of the LTE coverage. In such contexts, the inter-frequency measurements were only triggered when necessary, and measurement gaps and corresponding inter-frequency measurements were used only when really needed, because measurement gaps reduce the maximum available throughput, and make data scheduling more complex.

For example, a network node responsible for data scheduling needs to take the Hybrid Automatic Repeat reQuest, HARQ, round trip times into account and therefore, using LTE timing as an example, the practical scheduling gap to a device using inter-frequency measurement gaps is ten milliseconds, based on a six millisecond gap time plus a four millisecond HARQ round trip time. This timing translates into a twenty-five percent throughput loss/scheduling time loss, for the case of forty milliseconds between measurement gaps.

In further detail, a device may monitor several frequency carriers, which may be regarded as frequency layers. In Release 11 of the 3GPP specification, depending on the device capability, it may be possible to measure up to seven different frequency layers, including LTE TDD/FDD, WCDMA, GSM, etc. Each frequency layer requires a certain radio time for detection and verification of cells on that layer, and the current 3GPP specification is based on a worst-case scenario with respect to Doppler and delay spread, as well as Signal to Noise Ratio (SNR) requirements on cells on the layer.

Additionally, as discussed above, gap measurement requirements mainly target the coverage problem. Thus, the requirements for inter-frequency measurements are conventionally based on detecting rather weak cells on another carrier frequency, to ensure that a reliable HO can be made prior to going out-of-coverage on the current carrier frequency. For example, with reference to Section 8.1.2.1.1.1 of 3GPP TS 36.133, the current measurement requirements to find a cell is in the order of 3.84*Nfreq seconds, where Nfreq is the number of layers needed to measure on, and where detection is geared towards the detection of a weak signal, e.g., Es/Iot=−4 dB. Consequently, having several layers, as exemplified in FIG. 1, implies that from a specification point of view, the device may need tenths of seconds in gap mode to find a suitable cell for HO. That time is problematic in terms of capacity reduction and other considerations.

In a known mitigation of such problems, a device may be configured to measure only on a subset of frequency layers, e.g., on only two frequency layers among a larger number of available frequency layers. However, this mitigation approach is complicated in a number of respects. For example, the network generally will not know which subset of the frequency layers is most suitable or useful for monitoring by the device. For example, with carriers operating at 2-3 GHz, a difference of only a few meters in device location may change which frequency from among f1, f2 and f3 would be better for the device to camp on.

SUMMARY

In one aspect of the teachings herein, a wireless device operating in a wireless communication network determines the measurement rate to use for making inter-frequency measurements on a given frequency layer, based on a performance requirement specified for that layer. For example, the wireless device uses a higher measurement rate for a frequency layer that has a performance requirement that is higher than the performance requirement specified for another one of the layers on which it is to perform inter-frequency measurements. Correspondingly, in an example scenario, a network node sends measurement configuration information to a targeted device, where that information indicates the layers on which the device is to perform inter-frequency measurements and indicates the performance requirements corresponding to respective ones of those layers. By way of example, the network node may be a base station, a relay, or another wireless device.

In an example, embodiment, a wireless device, such as a 3GPP User Equipment, UE, is configured to perform a method for performing inter-frequency measurements with respect to two or more frequency layers. The method includes receiving measurement configuration information from a node in a wireless communication network, where the measurement configuration information indicates a first performance requirement for making inter-frequency measurements on a first frequency layer and a different, second performance requirement for making inter-frequency measurements on a second frequency layer. The method further includes determining first and second measurement rates, respectively, based on the first and second performance requirements, allocating measurement gaps for making inter-frequency measurements on the first and second frequency layers, respectively, in proportion to the first and second measurement rates, and performing inter-frequency measurements on the first and second frequency layers in the respectively allocated measurement gaps.

In a corresponding example embodiment involving network-side processing, a network node is configured for operation in a wireless communication network and performs a method that includes determining a first performance requirement for making inter-frequency measurements a first frequency layer and a second performance requirement for making inter-frequency measurements on a second frequency layer. The method further includes generating measurement configuration information indicating the first and second performance requirements for the first and second frequency layers, respectively. Processing according to the method additionally includes sending the measurement configuration information to a targeted wireless device operating in the wireless communication network, to thereby configure the wireless device to use the first performance requirement for making inter-frequency measurements on the first frequency layer and to use the second performance requirement for making inter-frequency measurements on the second frequency layer.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 3:
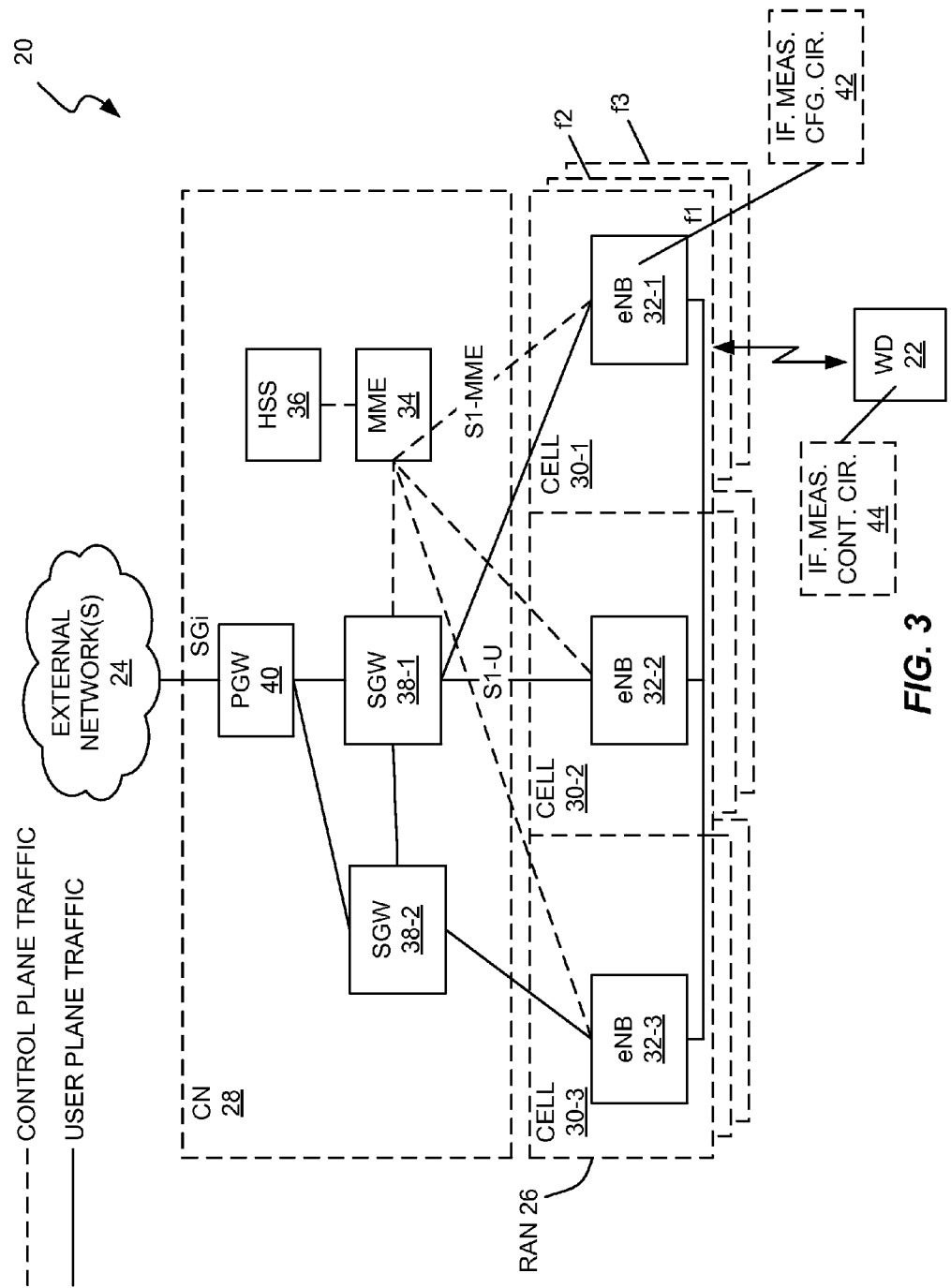
FIG. 3 is a block diagram of an example embodiment of a wireless communication network, including network nodes configured according to the teachings herein.

FIG. 3 illustrates one embodiment of a wireless communication network 20, depicted by way of example using nomenclature and arrangements typical of LTE networks.

The network 20 communicatively couples wireless devices 22 with one or more external networks 24, such as the Internet or another packet data network, PDN.

The network 20 includes a Radio Access Network, RAN, 26 and a Core Network, CN, 28. For the depicted LTE embodiment, the RAN 26 comprises an Evolved Universal Terrestrial Radio Access Network or E-UTRAN, and the CN 28 comprises an Evolved Packet Core or EPC. In this example, the RAN 26 provides service in a number of cells 30 controlled by corresponding base stations, shown here as "eNBs" or "eNodeBs" 32, in keeping with the LTE context. Further in keeping with the example LTE context, the CN 28 includes a Mobility Management Entity, MME, 34, a Home Subscriber Server, HSS, 36, one or more Serving Gateways, SGWs, 38-1, 38-2, and a Packet Gateway, PGW, 40, at the packet interface, SGi, between the CN 28 and the external network(s) 24.

Certain aspects of the network 20 are simplified for purposes of discussion and there may be multiple other entities present in an actual implementation and/or certain entities or the connections between them may vary in an actual implementation. Further, given network implementations may use other nomenclature or entity arrangements to provide similar functionality and the teachings herein are not limited to the example network arrangement depicted in FIG. 3.

In general, each eNodeB 32 provides service in one or more cells 30, which are shown as cells 30-1 through 30-3 for example purposes. More particularly, the diagram illustrates that one or more of the eNodeBs 32 may provide multiple cells using different carrier frequencies or frequency bands/sub-bands. By way of example, one or more of the depicted eNodeBs 32 use carriers on frequencies f1, f2, f3, meaning that there are one or more corresponding cells 30 on each such frequency. For example, a given eNodeB 32 may provide three cells 30, with each such cell 30 operating on a respective one of carrier frequencies f1, f2, and f3. More generally, a given eNodeB 32 may provide any number of cells 30, with each such cell 30 operating on a different carrier frequency and therefore belonging to a different frequency layer.

Figure 1:
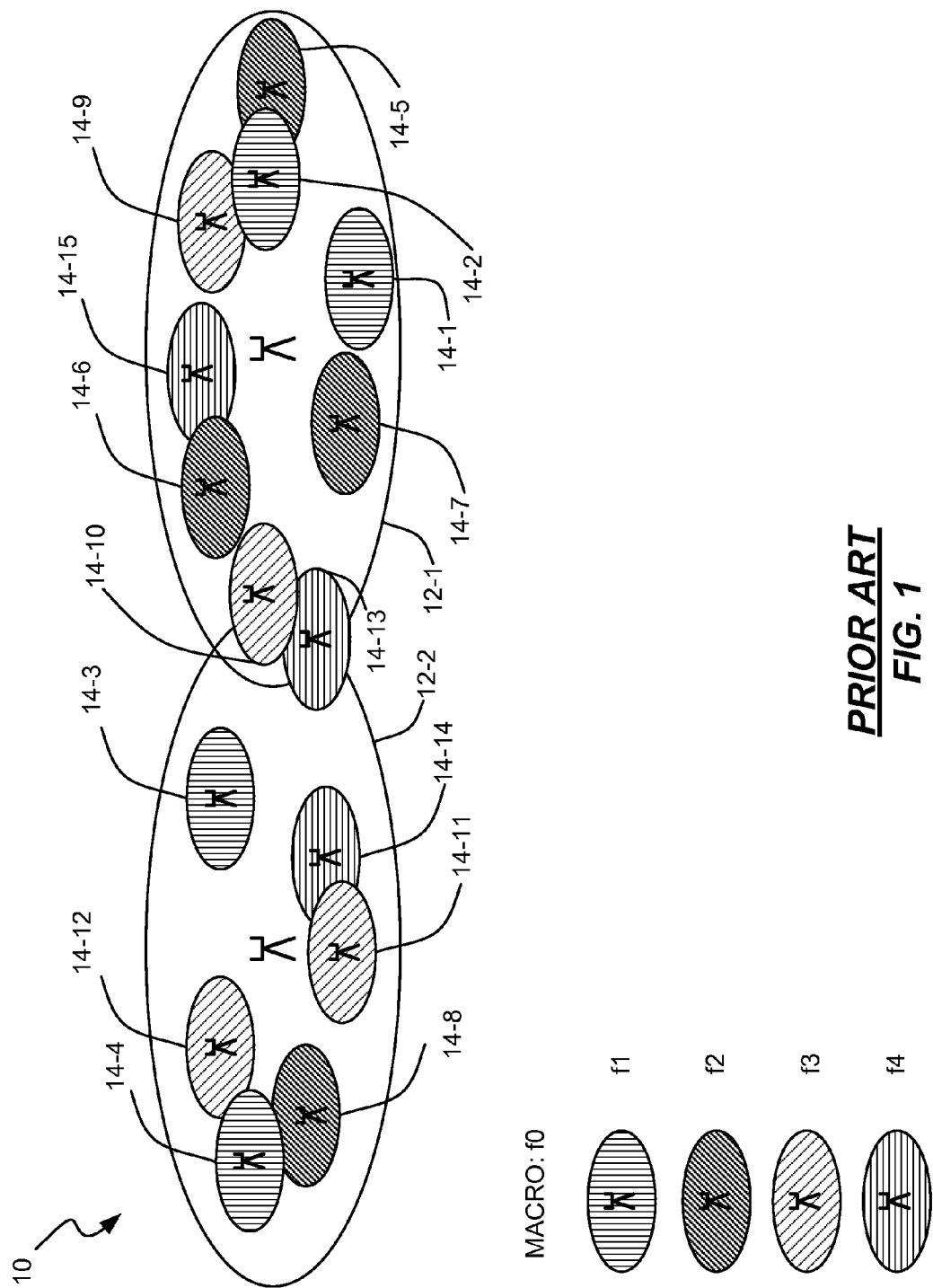
FIG. 1 is a block diagram of a known arrangement for a heterogeneous wireless communication network.
Figure 2:
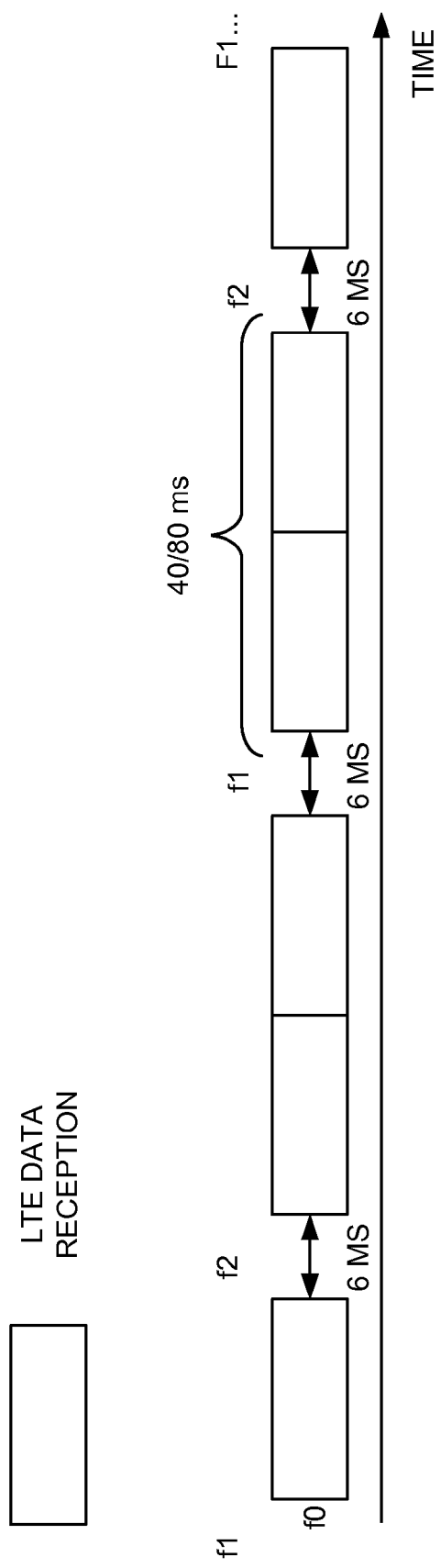
FIG. 2 is a diagram of a known configuration for performing inter-frequency measurements using configured measurement gaps.

Of course, other configurations are possible and there may be a mix of macro and micro base stations in the RAN 26, e.g., in a heterogeneous network arrangement, such as that shown in FIG. 1. There also may be overlaid RANs, i.e., different RATs, with each RAT providing cells operating according to the particulars of the RAT. In broad terms, then, it will be understood that at one or more given locations within the geographic coverage area of the network 20, a given wireless device 20 may be able to "see" one or more cells on respective ones of multiple frequency layers, where a "frequency layer" denotes a particular carrier frequency or frequency band, and where different frequency layers may belong to the same RAT or to different RATs.

Figure 4:
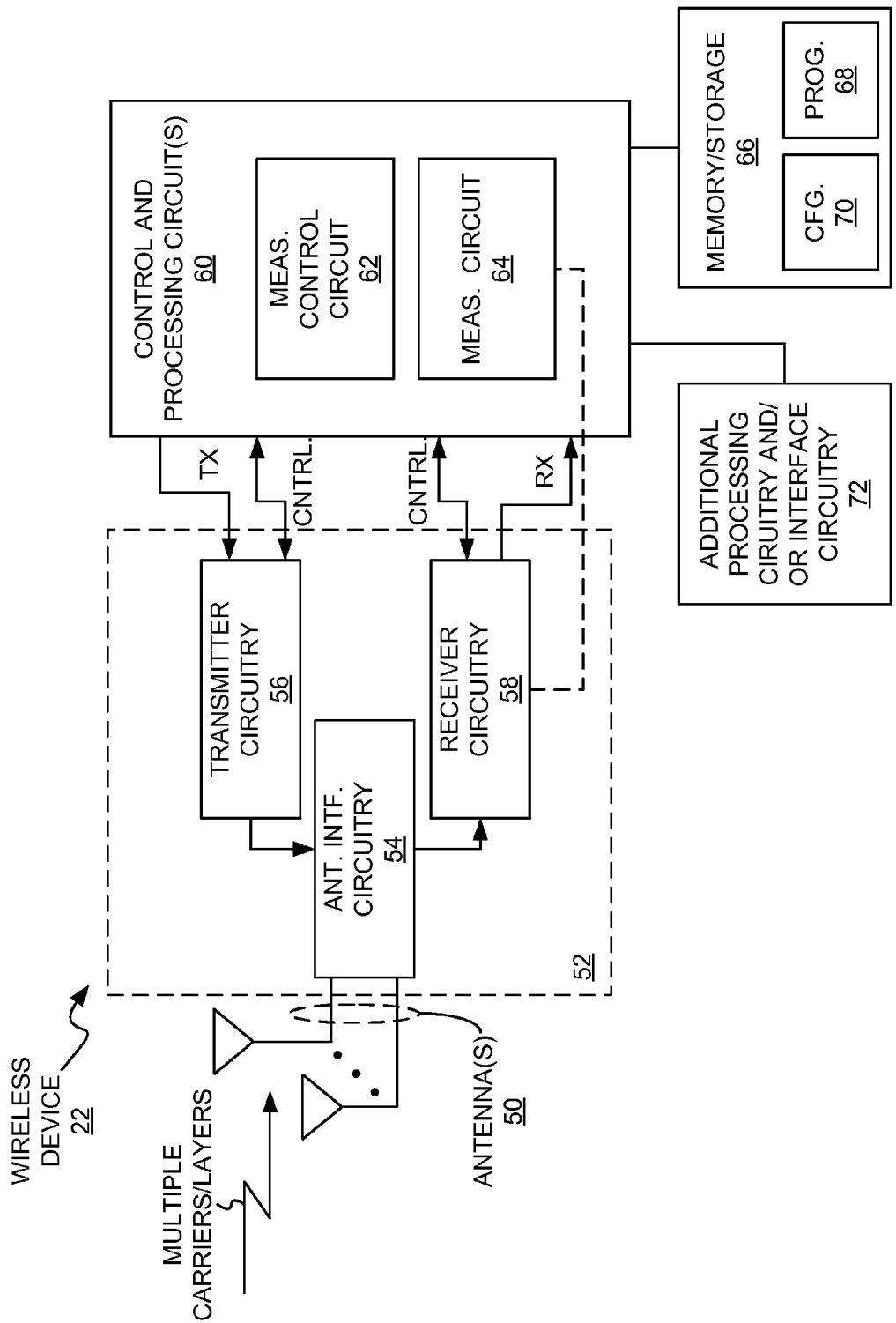
FIG. 4 is a block diagram of an example embodiment of a wireless device, such as the one introduced in FIG. 3.

FIG. 4 illustrates an example configuration for the wireless device 22 introduced in FIG. 3, where the wireless device 22 includes one or more antennas 50 and a corresponding communication transceiver 52, which includes antenna interface circuitry 54, transmitter circuitry 56 and receiver circuitry 58. It will be appreciated that the depicted transmitter circuitry 56 may be realized as a complete transmitter configured for operation within one or more supported types of wireless communication networks and, likewise, the depicted receiver circuitry 58 may be realized as a complete receiver configured for operation in the same such network(s). However, certain aspects of transmit and receive processing also may be performed in the depicted control and processing circuits 60, which are simply referred to as "one or more processing circuits 60" or "processing circuit(s) 60".

Indeed, in one embodiment, certain analog and other transmit/receive, TX/RX, circuitry is implemented by way of the depicted transmitter and receiver circuitry 56 and 58, while baseband digital TX/RX processing is implemented within the processing circuit(s) 60. It will thus be appreciated that the processing circuit(s) 60 may comprise one or more microprocessors, microcontrollers, DSPs, FPGAs, ASICs, or other digital processing circuitry that is configured to carry out inter-frequency measurements, including inter-RAT measurements, according to the teachings herein.

In one example, the processing circuit(s) 60 at least functionally include a measurement control circuit 62, which controls inter-frequency measurements, e.g., according to a measurement gap configuration. The processing circuit(s) 60 also may include a measurement circuit 64 for making inter-frequency measurements, e.g., for making signal quality or strength measurements on different frequency layeres. The measurement circuit 64 also may be at least partly implemented in the communication transceiver 52, e.g., to the extent that analog signal measurements are made.

The wireless device 22 in the illustrated example further includes memory/storage 66, which comprises one or more types of computer-readable media, and in one or more embodiments includes non-volatile memory, such as FLASH, EEPROM, etc. The memory/storage 66 in at least one embodiment stores a computer program 68. In at least one embodiment, the processing circuit(s) 60 are configured to carry out the inter-frequency measurement control and processing taught herein, at least partly based on its execution of the computer program instructions comprising the computer program 68.

The memory/storage 66 in some embodiments further stores configuration information 70, and the wireless device 22 in at least some embodiments includes additional processing circuitry and/or interface circuitry 72. Such circuitry includes, for example, application processors, user interface circuitry, etc. The configuration information 70 comprises, for example, a mapping between indicator values and corresponding performance requirements, so that the performance requirement for a given frequency layer may be identified to the wireless device 22 by associating the corresponding indicator with that frequency layer, e.g., in a configuration message sent to the wireless device 22.

Regardless of these implementation details, the wireless device 20 is configured to perform inter-frequency measurements with respect to two or more frequency layers, during operation in a wireless communication network, e.g., while operating in the network 20. The wireless device 22 includes the aforementioned communication transceiver 52 and one or more processing circuits 60, where the communication transceiver 52 is configured for transmitting signals to the network 20 and receiving signals from the network 20.

Further, the one or more processing circuits 60 are configured to receive measurement configuration information from a node in the network 20. For example, the node may be a serving base station, a relay, or another device 22. The measurement configuration information indicates a first performance requirement for making inter-frequency measurements on a first frequency layer and a different, second performance requirement for making inter-frequency measurements on a second frequency layer, and the one or more processing circuits 60 are correspondingly configured to determine first and second measurement rates, respectively, based on the first and second performance requirements, and to allocate measurement gaps for making inter-frequency measurements on the first and second frequency layers, respectively, in proportion to the first and second measurement rates. Based on these allocations, the one or more processing circuits 60 are configured to perform inter-frequency measurements on the first and second frequency layers in the respectively allocated measurement gaps. Here, it will be understood that "performing" the measurements may comprise controlling the receiver circuitry 58 and the measurement circuit 64 according to the gap allocations.

As a working example, the first performance requirement is more stringent than the second performance requirement. Here, the one or more processing circuits 60 are configured to set the first measurement rate higher than the second measurement rate, so that relatively more inter-frequency measurements are made with respect to the first frequency layer, as compared to the second frequency layer. In understanding this example, consider that in some embodiments the first and second performance requirements define first and second cell detection times, respectively, or define first and second cell detection strengths, respectively, from which the first and second cell detection times are derived.

In some embodiments, a number of predefined performance requirements are known to the wireless device 22 and the processing circuit(s) 60 are configured to determine which predefined performance requirements to use as said first and second performance requirements based on one or more indicators conveyed in the measurement configuration information. For example, the configuration information 70 includes mapping information that maps a given indicator value to a respective one of the predefined performance requirements. Thus, the measurement configuration information may more efficiently convey performance requirements based on conveying indicators that map to predefined performance requirements. Further, an indication may be implicit—for example, the wireless device 22 may assume that a default or nominal performance requirement applies to inter-frequency measurements on a given frequency layer unless the measurement configuration information indicates otherwise.

In any case, the processing circuit(s) 60 are configured to allocate measurement gaps to respective frequency layers in proportion to corresponding performance requirements. For example, with respect to two given frequency layers referred to for convenience as "first" and "second" frequency layers, the processing circuit(s) 60 are configured to allocate a first percentage of measurement gaps from among a configured plurality of measurement gaps for making inter-frequency measurements on the first frequency layer, and to allocate a second percentage of measurement gaps from among the configured plurality of measurement gaps for making inter-frequency measurements on the second frequency layer. In particular, the first and second percentages are proportional to the first and second measurement rates. As noted, the first measurement rate is determined according to a first performance requirement applicable to inter-frequency measurements on the first frequency layer, and the second measurement rate is determined according to a second performance requirement applicable to inter-frequency measurements on the second frequency layer.

The "configured plurality" of measurement gaps in the above description may be defined or otherwise known from inter-frequency measurement configuration determined by the network 20 and signaled to the wireless device 22. For example, the network 20 may configure the wireless device 22 to use make inter-frequency measurements in a 6 ms gap every 40 ms or every 80 ms, and thus there is a defined number of such gaps over any given window of time, and that number of available gaps may be allocated proportionally, according to the teachings herein.

In a general case, the one or more processing circuits 60 are configured to make inter-frequency measurements on a number of frequency layers, including first and second frequency layers, according to a number of different performance requirements, including first and second performance requirements that respectively correspond to the first and second frequency layers. In this context, the one or more processing circuits 60 are configured to determine the measurement rate to use for each frequency layer based on the corresponding performance requirement indicated or otherwise known for the frequency layer.

Of course, the same performance requirement may apply to more than one frequency layer and in one or more embodiments the one or more processing circuits 60 are configured to use the same measurement rate for frequency layers having the same performance requirement. Further, in at least one embodiment, the one or more processing circuits 60 are configured to group the inter-frequency measurements by at least one of frequency values and radio access technologies (RATs). Using that technique, inter-frequency measurements for frequency layers in adjacent or proximate frequency bands are grouped together, and inter-frequency measurements for frequency layers on a same RAT are grouped together.

In other words, in one or more configurations of the processing circuit(s) 60, the wireless device 22 uses adjacent or consecutive measurement gaps to make inter-frequency measurements on frequency layers within the same frequency band or on frequency layers that are ordered in terms of increasing or decreasing frequency, which can simplify or otherwise make receiver frequency adjustments more efficient. Additionally or alternatively, the wireless device 22 uses adjacent or consecutive measurement gaps for inter-frequency measurements being made on frequency layers within the same RAT, which minimizes switching back and forth between RATs. In that regard, it should be understood that the above-mentioned first and second frequency layers may be on different RATs, or on the same RAT. For a given number of frequency layers on which the wireless device 22 is to make inter-frequency measurements, all frequency layers may be on the same RAT, or they may involve two or more RATS.

Figure 5:
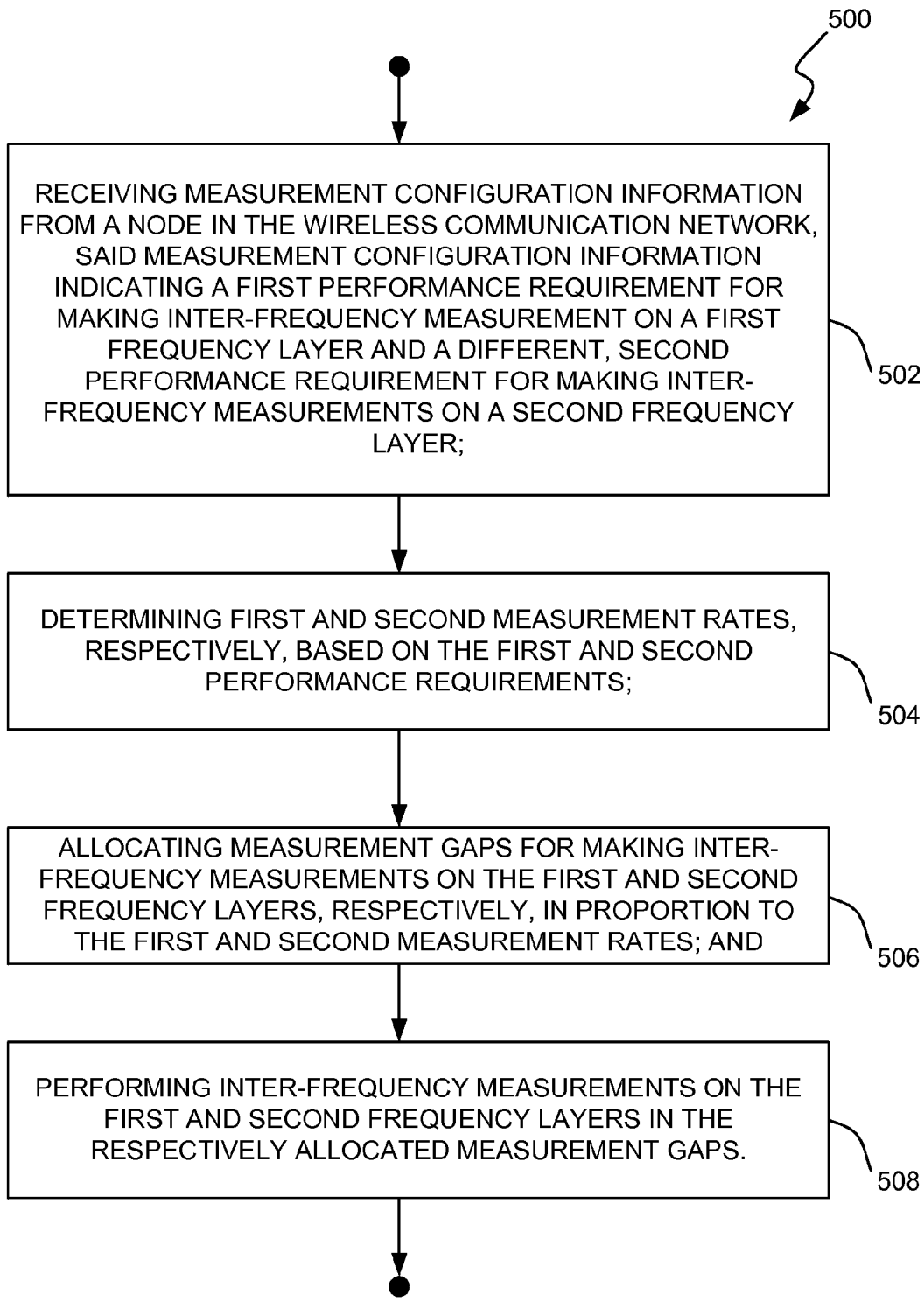
FIG. 5 is a logic flow diagram of an example embodiment of a method of performing inter-frequency measurements at a wireless device.

FIG. 5 illustrates a method 500 that serves as an example of the contemplated inter-frequency measurement control and processing contemplated herein for a wireless device 22. Unless otherwise noted, the illustrated processing steps or operations are not necessarily performed in the order illustrated and/or some operations may be performed in parallel, in the background, or as part of overall operations at the wireless device 22. Further, the illustrated method 500 may be repeated or otherwise performed on an ongoing basis, at least when inter-frequency measurements are activated.

With the above in mind, the method 500 is directed to performing inter-frequency measurements with respect to two or more frequency layers, and it includes receiving (Block 502) measurement configuration information from a node in the wireless communication network 20. The node is, for example, a serving base station, such as a serving eNodeB 32. The received measurement configuration information indicates a first performance requirement for making inter-frequency measurements on a first frequency layer and a different, second performance requirement for making inter-frequency measurements on a second frequency layer (Block 502).

Correspondingly, the method 500 further includes determining (Block 504) first and second measurement rates, respectively, based on the first and second performance requirements. The measurement rates may be calculated on the fly, in dependence on the corresponding performance requirements, or the measurement rate to use for a given performance requirement may be predefined and selected accordingly, e.g., a default measurement rate may apply to a default performance requirement, with a higher measurement rate or rate offset defined for a more stringent performance requirement. In any case, the method 500 includes allocating (block 506) measurement gaps for making inter-frequency measurements on the first and second frequency layers, respectively, in proportion to the first and second measurement rates, and performing (Block 508) inter-frequency measurements on the first and second frequency layers in the respectively allocated measurement gaps.

Figure 6:
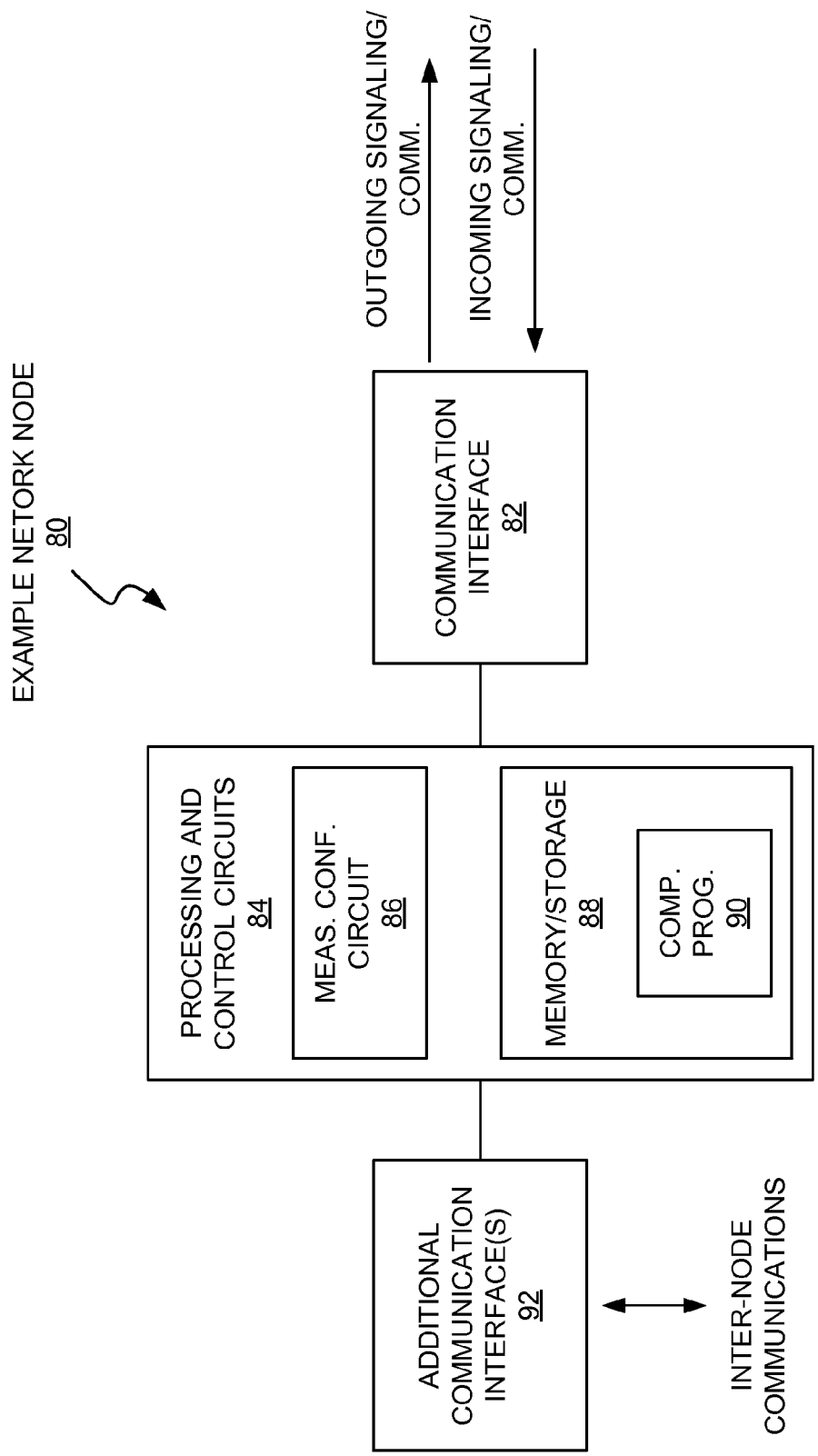
FIG. 6 is a block diagram of an example embodiment of a network node, such as base station, relay node, or other wireless device in the example network of FIG. 3.

FIG. 6 illustrates an example network node 80, e.g., a node that is configured for operation in the network 20 and in particular is configured to provide the aforementioned measurement configuration information to one or more wireless devices 22 operating in the network 20. In a non-limiting example, the node 80 can be understood as a given one of the eNodeBs 32 introduced in FIG. 3. More generally, however, the node 80 may be any node that is remote with respect to the wireless device 22, such as a base station, a relay node, and even another wireless device 22 in device-to-device, D2D, communication.

A communication interface 82 included in the node 80 is configured for sending and receiving signaling, and is operatively associated with processing and control circuits 84, which are referred to as "one or more processing circuits 84" or "processing circuit(s) 84". In an example case where the node 80 is a base station or other radio node for use in a wireless communication network 22, the communication interface 82 comprises radiofrequency circuitry, e.g., pools of transmit and receive circuitry for transmitting broadcast and control signaling, and for transmitting and receiving user traffic on shared and/or dedicated channels. More generally, in such cases, the communication interface 82 will be understood as comprising cellular transceiver circuitry for implementing the uplink/downlink air interface used to connect wireless devices 22 to the network 20. The communication interface 82 may comprise multi-carrier/multi-frequency radio circuits.

Further, in an example configuration, the processing circuit(s) 84 include a measurement configuration circuit 86, which is configured to perform the network-side inter-frequency measurement processing configuration and control taught herein. The processing circuit(s) 84 further include or are associated with memory/storage 88, which may comprise one or more types of computer-readable media, such as non-volatile memory, disk storage, etc., and which may also include working memory. In some embodiments, the memory/storage 88 stores a computer program 90 that, when executed by the processing circuit(s) 84 configure the node 80 according to the network-side teachings herein. It will be appreciated that in an example embodiment, the processing circuit(s) 84 comprise one or more microprocessors, microcontrollers, DSPs, FPGAs, ASICs, or other digital processing circuitry that is configured to carry out network-side processing according to the teachings herein—e.g., to determine the measurement configurations to be used by one or more wireless devices 22 in making inter-frequency measurements and to generate and transmit the corresponding measurement configuration messages.

Further, in some embodiments, the network node 80 includes additional communication interfaces 92, such as "X2" interface circuitry used to provide inter-eNodeB communications in an LTE context, and/or one or more interfaces to other nodes in the CN 28 of the network 20. As noted previously, in an example embodiment, the network node 80 is configured for operation in the network 20 and the communication interface 82 is configured for sending signaling to a targeted wireless device 22. Of course, more than one wireless device 22 can be targeted with respect to the processing and signaling contemplated herein for configuring inter-frequency measurements at such device.

Continuing with the example, the one or more processing circuits 84 are operatively associated with the communication interface 82 and configured to determine a first performance requirement for making inter-frequency measurements a first frequency layer and a second performance requirement for making inter-frequency measurements on a second frequency layer. In one example, "determining" a performance requirement comprises calculating a performance requirement. In another example, "determining" a performance requirement comprises selecting from among two or more predefined performance requirements, or otherwise selecting a performance requirement that is different from a default or nominal performance requirement.

The processing circuit(s) 84 are further configured to generate measurement configuration information indicating the first and second performance requirements for the first and second frequency layers, and send the measurement configuration information to a targeted wireless device 22 operating in the wireless communication network, to thereby configure the wireless device 22 to use the first performance requirement for making inter-frequency measurements on the first frequency layer and to use the second performance requirement for making inter-frequency measurements on the second frequency layer.

In some embodiments, the one or more processing circuits 84 are configured to determine the first and second performance requirements based on being configured to set or select a more stringent performance requirement for the first frequency layer and set or select a less stringent performance requirement for the second frequency layer, based on the first frequency layer being associated with a carrier that is deemed to be coverage related and the second frequency layer being associated with a carrier that is deemed to be capacity related. Here, a coverage-related carrier is one that is associated with providing service in a geographic coverage sense, while a capacity-related carrier is one that is associated with additional service capacity within a given coverage area and/or a carrier that is intended to provide hotspot, overlay, or higher-rate service within a given coverage area. In a non-limiting example, a coverage-related carrier can be a neighbor-cell carrier that is a candidate for handover of the target wireless device 20.

In at least one embodiment, the one or more processing circuit(s) 84 are configured to trigger the targeted wireless device 20 to perform inter-frequency measurements, e.g., by sending a configuration message to the targeted wireless device 20. Further, in at least one embodiment, the processing circuit(s) 84 are configured to send the measurement configuration information to the targeted wireless device 22 based on being configured to send a measurement configuration message to the targeted wireless device 22, where that message includes one or more indicators that indicate first and second performance requirements for first and second frequency layers, respectively.

In an example case, the measurement configuration information indicates the first and second performance requirements by conveying one or more indicators having a known mapping to a number of predefined performance requirements. The measurement configuration information may further indicate to the targeted wireless device 22 the frequency layers on which the targeted wireless device 22 is to perform inter-frequency measurements, including the first and second frequency layers, and indicate the corresponding performance requirement to be used by the targeted wireless device 22 for making the inter-frequency measurements on each such frequency layer.

Figure 7:
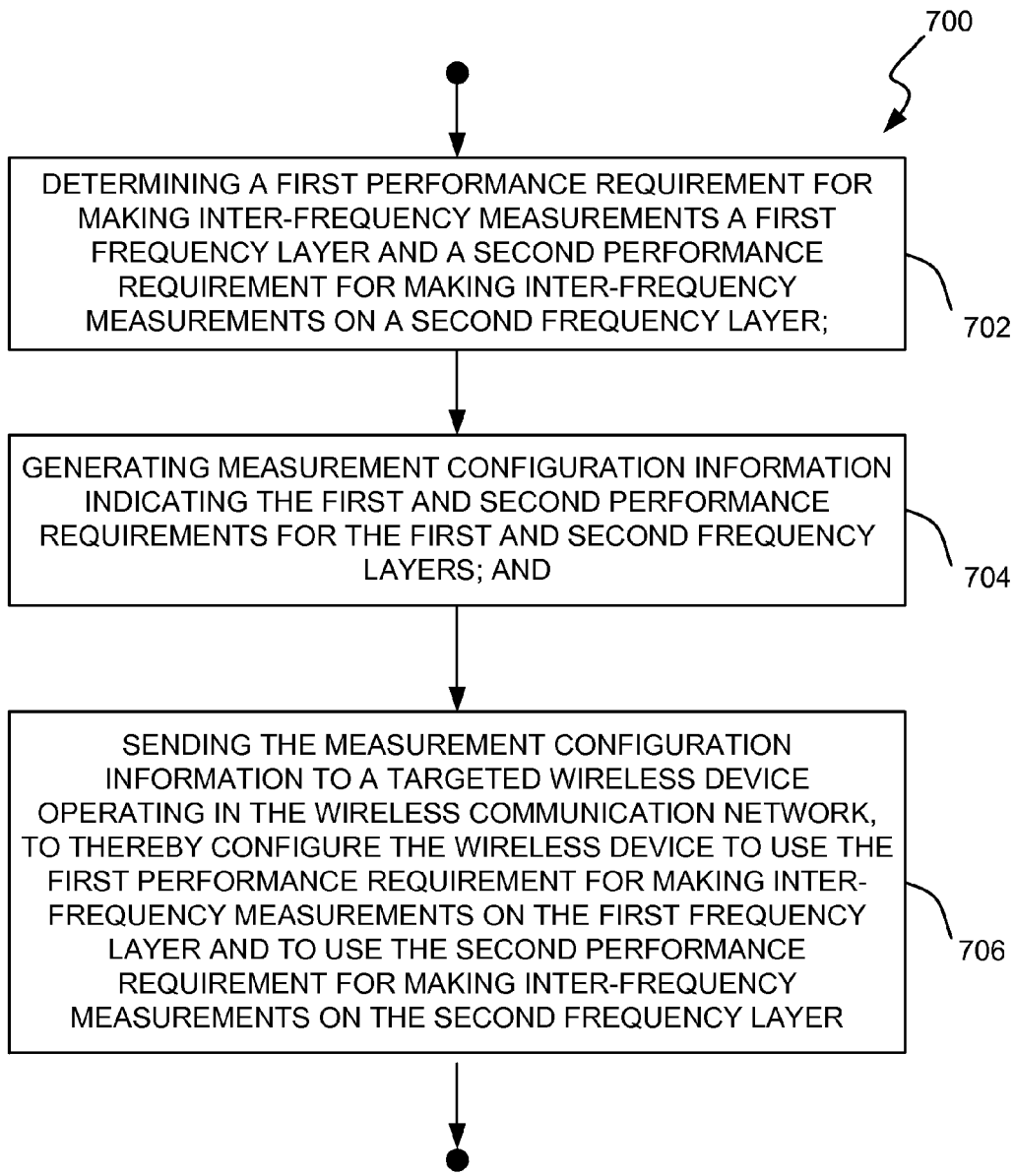
FIG. 7 is a logic flow diagram of an example embodiment of a method at a network node of configuring inter-frequency measurements for a targeted wireless device.

FIG. 7 illustrates a method 700, such as may be performed by the network node 80 introduced in FIG. 6. Unless otherwise noted, the processing steps or operations may be performed in an order other than that suggested by the diagram, and one or more of the operations may be performed in parallel, for the same or for different targeted wireless devices 22, for individual devices or for groups of devices. Further, some or all of the operations may be repeated or performed as needed, and may be performed as part of other processing operations carried out by the node 80.

With the above qualifications in mind, the method 700 includes determining (Block 702) a first performance requirement for making inter-frequency measurements a first frequency layer and a second performance requirement for making inter-frequency measurements on a second frequency layer, and generating (Block 704) measurement configuration information indicating the first and second performance requirements for the first and second frequency layers. The method 700 further includes sending (Block 706) the measurement configuration information to a targeted wireless device 22 operating in a wireless communication network 20, to thereby configure the wireless device 22 to use the first performance requirement for making inter-frequency measurements on the first frequency layer and to use the second performance requirement for making inter-frequency measurements on the second frequency layer.

In example embodiments in the context of the above discussion and related diagrams, a wireless device 22 uses measurement gaps to perform measurements on different frequency carriers or layers, where the wireless device 22 comprises a communication interface, e.g., a transceiver 52, that is configured to transmit and receive wireless signals to and from a wireless communication network 20, and further includes one or more processing circuits 60 that are operably associated with the communication interface 52. The processing circuit(s) 60 in an example embodiment are configured to receive a measurement configuration message via the communication interface, where that message defines different performance requirements for the different frequency carriers or layers. Such circuitry is further configured to determine different measurement rates or other measurement configuration parameters for the different carrier frequencies or layers, according to the respective performance requirements indicated by the measurement configuration message.

In an example case, the processing circuit(s) 60 determine measurement gap allocations for performing measurements on the different frequency carriers or layers, in dependence on the different performance requirements, so that respective ones of the frequency layers having comparatively higher performance requirements—more stringent requirements—have a higher measurement rate than respective ones of the carriers or layers having comparatively lower performance requirements—less stringent requirements. For example, the layers having higher performance requirements are allocated more measurement gaps than respective ones of the layers having relatively lower performance requirements. The processing circuit(s) 60 are further configured to measure—or at least to control measurements on—the different frequency layers, according to the measurement gap allocations.

In one or more embodiments, the measurement configuration message indicates carrier types or priorities for respective ones of the different frequency layers, and the one or more processing circuits 60 are configured to map the indicated carrier types or priorities to predefined performance requirements and to allocate measurement gaps accordingly. In at least one embodiment, the measurement configuration message indicates performance requirements for respective ones of the different carrier frequencies or layers in terms of signal detection levels or required detection times, and the device generally allocates more measurement gaps to those carrier frequencies or layers having lower signal detection levels or smaller required detection times.

The indication might also convey type indicators for the frequency layers. For example, a given frequency layer may be a coverage-type layer, while another frequency layer may be a capacity-type layer. Thus, the message may indicate the type of a given frequency layer and the device may be configured to map the indicated type to a performance requirement defined for that type. Thus, the measurement configuration message may indicate, e.g., "Type 1" for one frequency layer and "Type 2" for another frequency layer, and the device may be configured to recognize that the requirement for a Type 1 layer is −4 dB or Tbase=x, whereas the requirement for a Type 2 layer is 0 dB or Tbase=y.

In any case, the example network node 80 is configured for operation in a wireless communication network 20 and includes a communication interface 82 configured to transmit and receive wireless signals to and from a wireless device 22 operating in the wireless communication network 20, and one or more processing circuits 84 operably associated with the communication interface 82. The processing circuit(s) 84 are configured to determine different performance requirements for the wireless device 22, for respective ones among a number of different carrier frequencies or layers, to thereby control the measurement rate(s) used by the device 22 for the different frequency layers, such as to control the device's allocations of measurement gaps to the different frequency layers. The processing circuit(s) 84 are further configured to generate a measurement configuration message for the wireless device 22, indicating the different performance requirements, and to transmit the measurement configuration message to the wireless device 22.

In a more detailed example of the above teachings, consider that Release 11 of the 3GPP Technical Specifications define requirements regarding the time within which a wireless device should detect a new inter-frequency cell, once the signal strength for that cell becomes stronger than a certain level (Es/Iot>−4 dB). The time is defined as $$T_{Identify\_Inter} = T_{Basic\_Identify\_Inter} \cdot \frac{480}{T_{Inter1}} \cdot N_{freq} \text{ ms},$$

where TBasic_Identify_Inter=480 ms. Tinter1=60 or 30 ms, respectively, depending on whether the 40 or 80 ms inter-frequency gap distance applies. Furthermore, Nfreq is the total number of frequency layers that the device needs to monitor. Hence, assuming a 40 ms gap period, the detection time is 3.84*Nfreq seconds and this holds for all cells with Es/Iot>−4 dB, where Es/Iot represents a Signal-to-Interference-plus-Noise Ratio (SINR).

Figure 8:
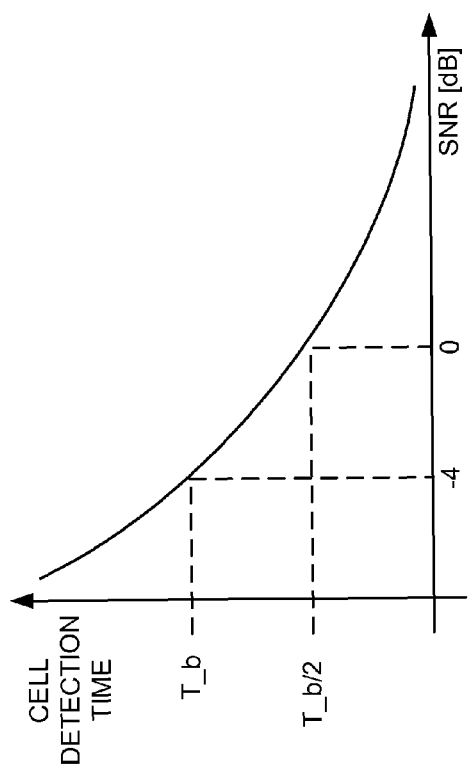
FIG. 8 is a plot of example cell detection times in dependence on signal strength.

However, cell detection time is heavily dependent on the SINR, as is shown by way of example in FIG. 8, which plots cell detection time as a function of SINR expressed in dB. In the diagram, T_b and Tb/2 indicate the time for detection with a certain probability—e.g., a ninety percent probability—for the different scenarios. Notably, the −4 dB requirement in the current 3GPP specification comes from the assumption that inter-frequency measurements are only needed for addressing coverage issues. However, in network deployments that use multiple frequency layers for capacity, a cell detection strength threshold of SINR=0 dB, for example, may be sufficient, and cell detection time might in that case be halved, or even further reduced.

Hence, one aspect of the teachings herein involves a new cell detection requirement with, for instance, a requirement to detect cells stronger than, say SINR 0 dB. In that case, T_Basic_Identify_Inter may be 240 ms. Of course, that value merely serves as an example, and other or additional values can be used as performance requirements. The network node 80 in this sense would configures different frequency layers with different detection requirements. In the example of FIG. 8, it may configured a first frequency layer, f1, with a standard or default requirement of −4 dB, while configuring a second and a third frequency layer, f2 and f3, with a new 0 dB requirement. Correspondingly, the contemplated wireless device 22 would, based on these example layers and corresponding performance requirements, allocate measurement gaps according to the layers' respective requirements. For example, the wireless device 22 allocates fifty-percent of the configured measurement gaps to f1, while allocating another twenty-five percent of them to f2 and the remaining twenty-five percent to f3. The respective measurement rates, i.e., the number of allocated measurement gaps per time unit, will be different for the various layers. In this example, the measurement rate of f1 is two times the measurement rate of f2 and f3, reflecting the more stringent detection requirement associated with f1.

Figure 9:
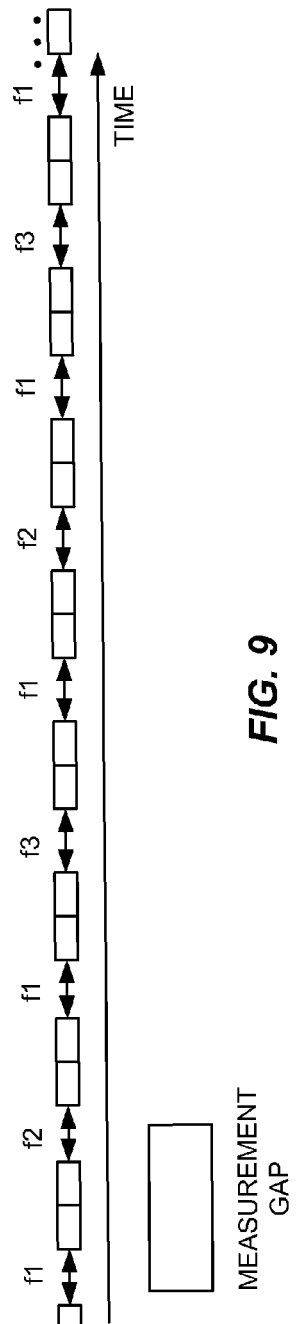
FIG. 9 is a diagram illustrating the allocation of measurement gaps for inter-frequency measurements on different frequency layers in proportion to corresponding performance requirements.

This scenario is well illustrated in FIG. 9. Carrier frequency f1 is a first frequency layer and its performance requirement is based on the Release 11 cell signal detection strength of −4 dB, which yields a cell detection time requirement of TBasic_Identify_Inter=480 ms. Carrier frequency f2 is a second frequency layer and its performance requirement is based on a cell signal detection strength of 0 dB, which yields a cell detection time requirement of TBasic_Identify_Inter=240 ms. The same 0 dB value is used for a third carrier frequency f3, as a third frequency layer on which the wireless device 22 is to perform inter-frequency measurements. As such, the cell detection time requirement for f3 also is 240 ms.

The wireless device 22 thus allocates fifty-percent of the measurement gaps to making measurements on f1, another twenty-five percent of the measurement gaps to making measurements on f2, and the remaining twenty-five percent of measurement gaps to making measurements on f3. Advantageously, then, the wireless device 22 monitors three frequencies, f1, f2, f3 in the same time it would take to monitor two frequencies using the standard cell detection time for both frequencies. Again, in one or more embodiments, inter-frequency measurements related to coverage issues will generally receive a greater allocation of measurement gaps than inter-frequency measurements related to capacity issues.

Figure 10:
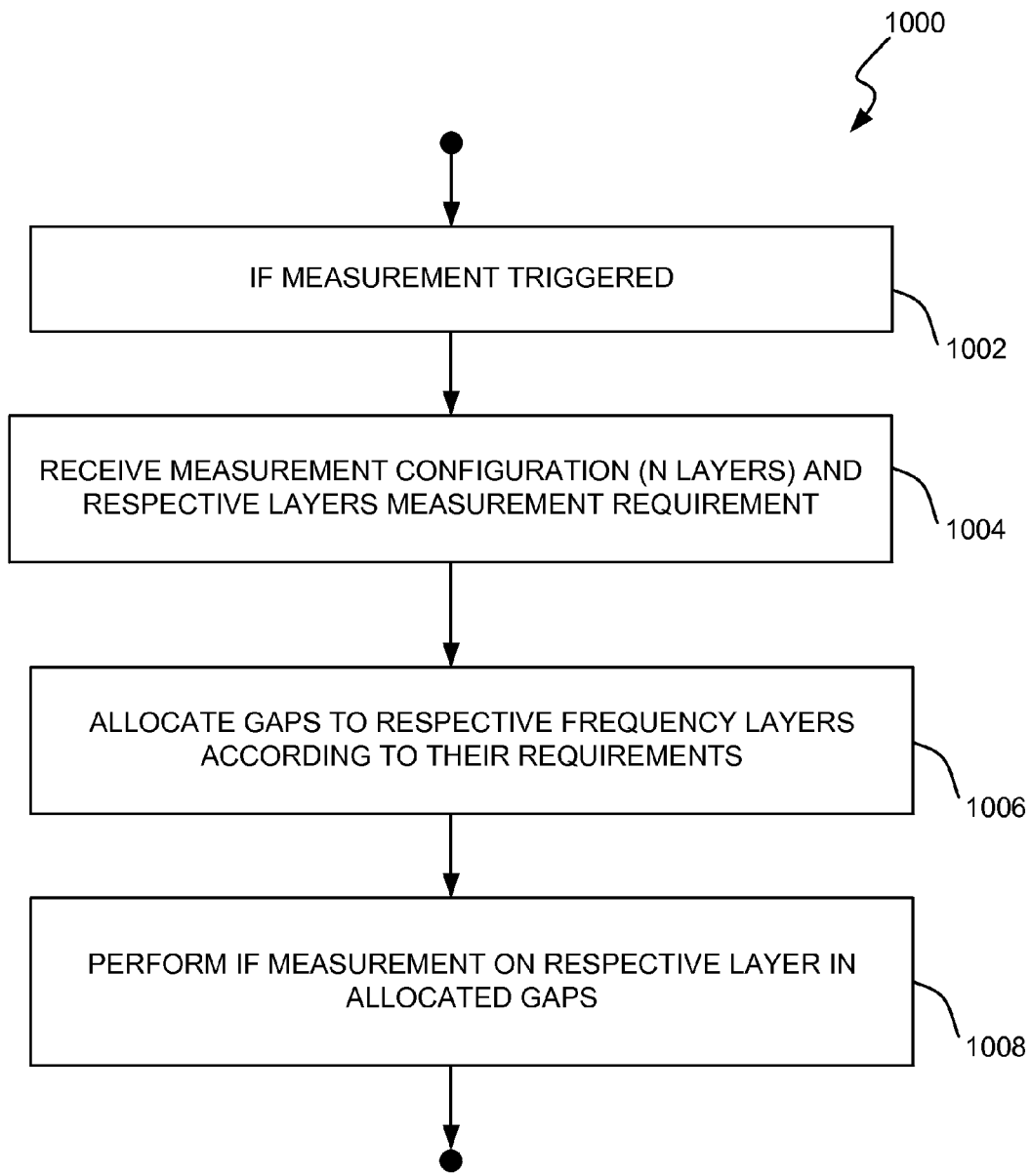
FIG. 10 is a logic flow diagram of another example embodiment of performing inter-frequency measurements at a wireless device.

FIG. 10 is a flow chart representing another embodiment of processing at the wireless device 22. The method 1000 as illustrated in FIG. 10 therefore can be understood as an extension or refinement of the method 500 introduced in FIG. 5.

According to the method 1000, a wireless device 22 is connected to a serving cell in a wireless communication network 20 and inter-frequency measurement has been triggered (Block 1002), either by the wireless device 22—e.g., based on signal strength measurements—or autonomously by the network 20. The wireless device 22 receives (Block 1004) a measurement configuration message from the network 20, including, say N layers to measure on, together with measurement requirements corresponding to the respective layers. For instance, the wireless device 22 may receive a matrix of requirements, (f_i, r_i), i=1, . . . N, where f_i corresponds to carrier frequency and r_i corresponds to the requirement. The requirement may be defined as value of T_Basic_Identify_Inter. In another example, the requirement may be a parameter with two values (1, 2) say, where 1 denotes Release 11 requirements, while 2 denotes for a different requirement. Note, too, that the received information may, in addition to indicating the respective frequency layers, indicate the involved RATs.

The wireless device 22 then allocates (Block 1006) measurement gaps to respective ones of the frequency layers according to their corresponding requirements. For example, for N frequency layers, the number of gaps allocated to layer i should be proportional to Allocated ratio of gaps=$r\_i/(r\_1+r\_2+ \ldots r\_N)$.

Then the wireless device 22 performs (Block 1008) gap measurements on the respective layers in the allocated gaps. The allocation may be of round robin type, but may also use other approaches. The intention is that over a long time period, the number of gaps is allocated to a given frequency layer is in accordance with the corresponding requirement, so the contemplated method also covers the case where the wireless device 22 allocates the first portion of gaps to layer 1, the next portion to layer 2, etc.

Among the numerous advantages attending the teachings herein, inter-frequency measurements over a given number of frequency layers are performed faster than would otherwise be possible, to the extent that one or more of those layers have a performance requirement that is comparatively less stringent than one or more of the other layers. From another perspective, a wireless device 22 operating according to the teachings herein can make inter-frequency measurements on more layers within a given window of time, by making fewer measurements on those layers having less stringent performance requirements. These operations provide for faster handover and/or allow for less time spent making inter-frequency measurements.

As such, a wireless device configured according to the teachings herein can more quickly detect the best carrier from among a number of carriers, via inter-frequency measurements, and at the same time restrict the number of carriers the device measures on, to thereby reduce the measurement burden imposed on the device. Such techniques may offer particular advantages in deployment scenarios where a network operator uses several carriers at a certain location, with some of the carriers allocated to macro cells and others allocated to hot spots, e.g., pico or femto cells.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a wireless device operating in a wireless communication network for performing inter-frequency measurements with respect to two or more frequency layers, said method comprising:
   receiving measurement configuration information from a node in the wireless communication network, said measurement configuration information indicating a first performance requirement for making inter-frequency measurements on a first frequency layer and a different, second performance requirement for making inter-frequency measurements on a second frequency layer;
   determining first and second measurement rates, respectively, based on the first and second performance requirements;
   allocating measurement gaps for making inter-frequency measurements on the first and second frequency layers, respectively, in proportion to the first and second measurement rates; and
   performing inter-frequency measurements on the first and second frequency layers in the respectively allocated measurement gaps.

2. The method of claim 1, wherein the first performance requirement is more stringent than the second performance requirement, and wherein the method includes setting the first measurement rate higher than the second measurement rate, so that relatively more inter-frequency measurements are made with respect to the first frequency layer, as compared to the second frequency layer.

3. The method of claim 1, wherein the first and second performance requirements define first and second cell detection times, respectively, or define first and second cell detection strengths, respectively, from which the first and second cell detection times are derived.

4. The method of claim 1, wherein a number of predefined performance requirements are known to the wireless device and wherein the method includes determining which predefined performance requirements to use as said first and second performance requirements, based on one or more indicators conveyed in the measurement configuration information.

5. The method of claim 1, wherein allocating the measurement gaps comprises allocating a first percentage of measurement gaps from among a configured plurality of measurement gaps for making inter-frequency measurements on the first frequency layer, and allocating a second percentage of measurement gaps from among the configured plurality of measurement gaps for making inter-frequency measurements on the second frequency layer, said first and second percentages being proportional to the first and second measurement rates.

6. The method of claim 1, wherein the method includes making inter-frequency measurements on a number of frequency layers, including the first and second frequency layers, according to a number of different performance requirements, including the first and second performance requirements, and wherein the method includes determining the measurement rate to use for each frequency layer based on the corresponding performance requirement indicated for the frequency layer.

7. The method of claim 6, further comprising using the same measurement rate for frequency layers having the same performance requirement.

8. The method of claim 6, further comprising grouping the inter-frequency measurements by at least one of frequency values and radio access technologies (RATs), so that inter-frequency measurements for frequency layers in adjacent or proximate frequency bands are grouped together, or so that inter-frequency measurements for frequency layers for a same RAT are grouped together.

9. The method of claim 1, wherein the first and second frequency layers are on different radio access technologies (RATs).

10. The method of claim 1, wherein the first and second frequency layers on the same radio access technology (RAT).

11. A wireless device configured to perform inter-frequency measurements with respect to two or more frequency layers, during operation in a wireless communication network, said wireless device comprising:
    a communication transceiver configured for transmitting signals to the communication network and receiving signals from the communication network;
    one or more processing circuits operatively associated with the communication transceiver and configured to:
       receive measurement configuration information from a node in the wireless communication network, said measurement configuration information indicating a first performance requirement for making inter-frequency measurements on a first frequency layer and a different, second performance requirement for making inter-frequency measurements on a second frequency layer;
       determine first and second measurement rates, respectively, based on the first and second performance requirements;
       allocate measurement gaps for making inter-frequency measurements on the first and second frequency layers, respectively, in proportion to the first and second measurement rates; and
       perform inter-frequency measurements on the first and second frequency layers in the respectively allocated measurement gaps.

12. The wireless device of claim 11, wherein the first performance requirement is more stringent than the second performance requirement, and wherein the one or more processing circuits are configured to set the first measurement rate higher than the second measurement rate, so that relatively more inter-frequency measurements are made with respect to the first frequency layer, as compared to the second frequency layer.

13. The wireless device of claim 11, wherein the first and second performance requirements define first and second cell detection times, respectively, or define first and second cell detection strengths, respectively, from which the first and second cell detection times are derived.

14. The wireless device of claim 11, wherein a number of predefined performance requirements are known to the wireless device and wherein the one or more processing circuits are configured to determine which predefined performance requirements to use as said first and second performance requirements based on one or more indicators conveyed in the measurement configuration information.

15. The wireless device of claim 11, wherein the one or more processing circuits are configured to allocate the measurement gaps based on being configured to allocate a first percentage of measurement gaps from among a configured plurality of measurement gaps for making inter-frequency measurements on the first frequency layer, and to allocate a second percentage of measurement gaps from among the configured plurality of measurement gaps for making inter-frequency measurements on the second frequency layer, said first and second percentages being proportional to the first and second measurement rates.

16. The wireless device of claim 11, wherein the one or more processing circuits are configured to make inter-frequency measurements on a number of frequency layers, including the first and second frequency layers, according to a number of different performance requirements, including the first and second performance requirements, and wherein the one or more processing circuits are configured to determine the measurement rate to use for each frequency layer, based on the corresponding performance requirement indicated for the frequency layer.

17. The wireless device of claim 16, wherein the one or more processing circuits are configured to use the same measurement rate for frequency layers having the same performance requirement.

18. The wireless device of claim 16, wherein the one or more processing circuits are configured to group the inter-frequency measurements by at least one of frequency values and radio access technologies (RATs), so that inter-frequency measurements for frequency layers in adjacent or proximate frequency bands are grouped together, or so that inter-frequency measurements for frequency layers for a same RAT are grouped together.

19. The wireless device of claim 11, wherein the first and second frequency layers are on different radio access technologies (RATs).

20. The wireless device of claim 11, wherein the first and second frequency layers on the same radio access technology (RAT).

* * * * *

UNITED STATES PATENT AND TRADEMARK OFFICE
CERTIFICATE OF CORRECTION

PATENT NO.         : 9,445,291 B2                                  Page 1 of 1
APPLICATION NO.    : 14/052021
DATED              : September 13, 2016
INVENTOR(S)        : Axmon et al.

It is certified that error appears in the above-identified patent and that said Letters Patent is hereby corrected as shown below:

In the Specification

Column 5, Line 50, delete "wireless device 20" and insert -- wireless device 22 --, therefor.

Column 6, Line 21, delete "layeres." and insert -- layers. --, therefor.

Column 6, Lines 47-48, delete "wireless device 20" and insert -- wireless device 22 --, therefor.

Column 8, Line 45, delete "RATS." and insert -- RATs. --, therefor.

Column 9, Line 36, delete "communication network 22," and insert -- communication network 20, --, therefor.

Column 10, Line 55, delete "wireless device 20." and insert -- wireless device 22. --, therefor.

Column 10, Lines 57-58, delete "wireless device 20" and insert -- wireless device 22 --, therefor.

Column 10, Lines 59-60, delete "wireless device 20." and insert -- wireless device 22. --, therefor.

Column 13, Line 7, delete "Tb/2" and insert -- T_b/2 --, therefor.

Signed and Sealed this
Third Day of January, 2017

Michelle K. Lee
*Director of the United States Patent and Trademark Office*